United States Patent
Han et al.

(10) Patent No.: US 8,835,073 B2
(45) Date of Patent: Sep. 16, 2014

(54) POLYMER MEMBRANE FOR BATTERY, METHOD OF PREPARING SAME AND BATTERY INCLUDING SAME

(75) Inventors: Sang-Il Han, Yongin-si (KR); Hee-Tak Kim, Yongin-si (KR); Dae-Young Lim, Yongin-si (KR); Jung-Nam Im, Gunpo-si (KR); Guk-Hwan An, Gyeongju-si (KR); Ki-Young Kim, Yongin-si (KR)

(73) Assignees: Samsung SDI Co., Ltd., Giheung-gu, Yongin-si, Gyeonggi-do (KR); Korea Institute of Industrial Technology, Cheonan-si, chungcheongnam-do (KR)

( * ) Notice: Subject to any disclaimer, the term of this patent is extended or adjusted under 35 U.S.C. 154(b) by 514 days.

(21) Appl. No.: 12/900,022

(22) Filed: Oct. 7, 2010

(65) Prior Publication Data
US 2011/0081594 A1    Apr. 7, 2011

(30) Foreign Application Priority Data
Oct. 7, 2009   (KR) .................. 10-2009-0095258

(51) Int. Cl.
| | |
|---|---|
| *H01M 8/10* | (2006.01) |
| *H01M 2/16* | (2006.01) |
| *H01M 8/02* | (2006.01) |
| *H01M 10/052* | (2010.01) |

(52) U.S. Cl.
CPC ............ *H01M 2/162* (2013.01); *H01M 8/1039* (2013.01); *H01M 8/1062* (2013.01); *H01M 8/0291* (2013.01); *H01M 10/052* (2013.01); *H01M 8/1023* (2013.01); *Y02E 60/12* (2013.01); *Y02E 60/521* (2013.01)
USPC ............................ 429/479; 429/492; 429/491

(58) Field of Classification Search
CPC . H01M 2/162; H01M 8/1039; H01M 8/1062; H01M 8/0291; H01M 10/052; H01M 8/1023
USPC .......................................... 429/479, 492, 491
See application file for complete search history.

(56) References Cited

U.S. PATENT DOCUMENTS

| | | | | |
|---|---|---|---|---|
| 4,830,904 | A | * | 5/1989 | Gessner et al. ............... 428/219 |
| 5,204,197 | A | * | 4/1993 | Takai et al. .................... 429/249 |
| 5,284,704 | A | | 2/1994 | Kochesky et al. |

(Continued)

FOREIGN PATENT DOCUMENTS

| | | |
|---|---|---|
| JP | 7-197362 A | 8/1995 |
| JP | 10-017692 | 1/1998 |

(Continued)

OTHER PUBLICATIONS

Korean Office action issued by KIPO on Jan. 16, 2012, corresponding to KR 10-2009-0095258 and Request for Entry attached herewith.

(Continued)

Primary Examiner — Helen O Conley
(74) Attorney, Agent, or Firm — Robert E. Bushnell, Esq.

(57) ABSTRACT

Disclosed is a polymer membrane for a battery including a porous support including a fiber including a core including a high melting-point polymer; and a sheath including a low melting-point polymer surrounding the core, and a method of preparing the same. The polymer membrane for a battery may further include a proton conductive polymer.

12 Claims, 8 Drawing Sheets

(56) References Cited

U.S. PATENT DOCUMENTS

| | | | |
|---|---|---|---|
| 5,456,982 A | | 10/1995 | Hansen et al. |
| 5,589,302 A | * | 12/1996 | Degen et al. .................. 429/250 |
| 6,001,752 A | * | 12/1999 | Ishizawa et al. .............. 442/362 |
| 7,470,488 B2 | | 12/2008 | Lee et al. |
| 7,709,153 B2 | | 5/2010 | Lee et al. |

FOREIGN PATENT DOCUMENTS

| | | |
|---|---|---|
| JP | 3885100 | 2/2007 |
| JP | 2008-262741 | 10/2008 |
| KR | 1996-0015656 B1 | 11/1996 |
| KR | 1020030084696 A | 11/2003 |
| KR | 10-20040092024 | 11/2004 |

OTHER PUBLICATIONS

Korean Office Action issued by KIPO, dated 17 May 2011, corresponding to Korean Patent Application No. 10-2009-0095258, together with Request for Entry.

\* cited by examiner

POLYMER MEMBRANE FOR BATTERY, METHOD OF PREPARING SAME AND BATTERY INCLUDING SAME

CLAIM OF PRIORITY

This application claims priority to and the benefit of Korean Patent Application No. 10-2009-0095258 filed in the Korean Intellectual Property Office on Oct. 7, 2009, the entire contents of which are incorporated herein by reference.

BACKGROUND OF THE INVENTION

1. Field of the Invention

This disclosure relates to a polymer membrane for a battery, a method of preparing the same and a battery including the same.

2. Description of the Related Art

Recently, various kinds of porous membranes have been actively developed for batteries. A porous membrane is used in a polymer electrolyte membrane for a fuel cell, a separator for a rechargeable battery, a cell barrier for an electrolysis condenser, a variety of filters, a moisture permeable water proof membrane, a precision filter membrane, and so on.

SUMMARY OF THE INVENTION

One aspect of this disclosure provides a polymer membrane for a battery having excellent dimensional stability and thermal stability.

Another aspect of this disclosure provides a method of manufacturing a polymer membrane for a battery.

Further, another aspect of this disclosure provides a battery including the polymer membrane for a battery.

According to one aspect, provided is a polymer membrane for a battery including a porous membrane that includes a fiber including: a core of a high melting-point polymer, and a sheath of a low melting-point polymer surrounding the core, wherein the melting point difference between the high melting-point polymer and the low melting-point polymer ranges from about 20° C. to about 160° C.

The polymer membrane for a battery may further include a proton conductive polymer impregnated in a porous support. The proton conductive polymer may be included at about 5 to about 95 volume % based on the total pore volume of the porous support. The polymer membrane for a battery further including the proton conductive polymer may be a polymer electrolyte membrane for a fuel cell.

Furthermore, the polymer membrane for a battery may be a separator for a rechargeable battery.

The high melting-point polymer may have a melting point (melting peak temperature) of about 200° C. to about 260° C. The high melting-point polymer may be selected from the group consisting of copolymer of poly(4-methyl pentene), 4-methyl pentene with C2 to C12 α-olefin, and a combination thereof. For example, the high melting-point polymer may be poly(4-methyl pentene).

The low melting-point polymer may have a melting point of about 100° C. to about 180° C. The low melting-point polymer may be a polyolefin having a melting point of about 100° C. to about 180° C. The low melting-point polymer may be selected from the group consisting of polypropylene, polyethylene, and a copolymer of polypropylene or polyethylene.

The low melting-point polymer may be included in about 5 parts by weight to about 50 parts by weight based on total 100 parts by weight of the low melting-point polymer and the high melting-point polymer.

According to another aspect of this disclosure, provided is a method of manufacturing a polymer membrane for a battery that includes preparing a non-woven fabric including a fiber having a core-sheath structure by spinning a high melting-point polymer resin by a first extruder to provide a core; spinning a low melting-point polymer resin by a second extruder to surround the core as a sheath; and calendaring the non-woven fabric to provide a porous support.

The method of manufacturing the polymer membrane for a battery may further include impregnating a proton conductive polymer in the porous support.

In addition, the method of manufacturing the polymer membrane for a battery may further include subjecting the porous support with a hydrophilic treatment before impregnating the proton conductive polymer in the porous support. The hydrophilic treatment may be selected from the group consisting of dipping the calendared porous support in acrylic acid; treating the calendared porous support surface; and dipping the calendared porous support in acrylic acid and treating the surface. The surface treatment of the porous polymer membrane may be selected from the group consisting of a plasma treatment, a corona treatment, a gamma-ray treatment, an electron beam treatment, and combinations thereof.

The porous support may have an average pore size of about 0.1 μm to about 1.0 μm. The porous support may have a porosity of about 20 to about 90%.

According to another embodiment, provided is a battery that includes a cathode and an anode facing each other and a polymer membrane for a battery usually positioned between the cathode and the anode.

It may provide a polymer membrane for a battery having improved dimensional stability and thermal stability, a method of preparing the same, and a battery including the same.

DESCRIPTION OF REFERENCE NUMERALS INDICATING PRIMARY ELEMENTS IN THE DRAWINGS

1: fuel cell system 3: electricity generating element
5: fuel supplier 7: oxidizing agent supplier
9: fuel tank 11: fuel pump
13: oxidizing agent pump 15: stack
17: membrane-electrode assembly 19, 19': separator
100: rechargeable lithium battery 112: anode
113: separator 114: cathode
120: battery case 140: sealing member 200: core-sheath fiber 230: side of sheath
240: side of core 250: cross-section of sheath
260: cross-section of core

DETAILED DESCRIPTION OF THE INVENTION

A porous membrane may be used for a polymer electrolyte membrane for a fuel cell. The fuel cell includes a stack substantially generating electricity, and the stack has a structure that is laminated with several, to several tens, of unit cells including a membrane-electrode assembly (MEA) and a separator (or referred to as a bipolar plate). The membrane-electrode assembly has an anode (referred to as a fuel electrode or an oxidation electrode) and a cathode (referred to as an air electrode or a reduction electrode) attached to each other with an electrolyte membrane therebetween.

The polymer electrolyte membrane is an insulator electrically separating an anode from a cathode in a fuel cell but acts as an intermediator transporting protons from the anode to the cathode during operation of the cell. It also acts to separate an oxidizing agent or a reactant. Accordingly, the polymer electrolyte membrane for a fuel cell is required to have excellent electrochemical stability, a decreased ohmic loss at a high current density, an excellent separating property of reactants during operation of the cell, and predetermined mechanical properties and dimensional stability for providing the stack structure.

On the other hand, a porous membrane may be used for a separator for a rechargeable battery. In a rechargeable battery, a separator including a porous membrane is generally interposed between electrodes in order to prevent contact between the electrodes and to maintain adsorbing storage of electrolyte. The separator is an important item that transmits reversibly transporting ions and prevents electrons from directly moving from plate to plate. When electrons flow directly from plate to plate, a short circuit is created which prevents electrons from flowing from the anode to the cathode through the circuit. The separator generally includes a polyethylene or polypropylene film. A conventional separator has problems in mechanical strength and durability.

Hereinafter, embodiments of the present invention are described in detail.

The polymer membrane for a battery according to one embodiment includes a porous support including a fiber having a core-sheath structure.

Figure 3A:
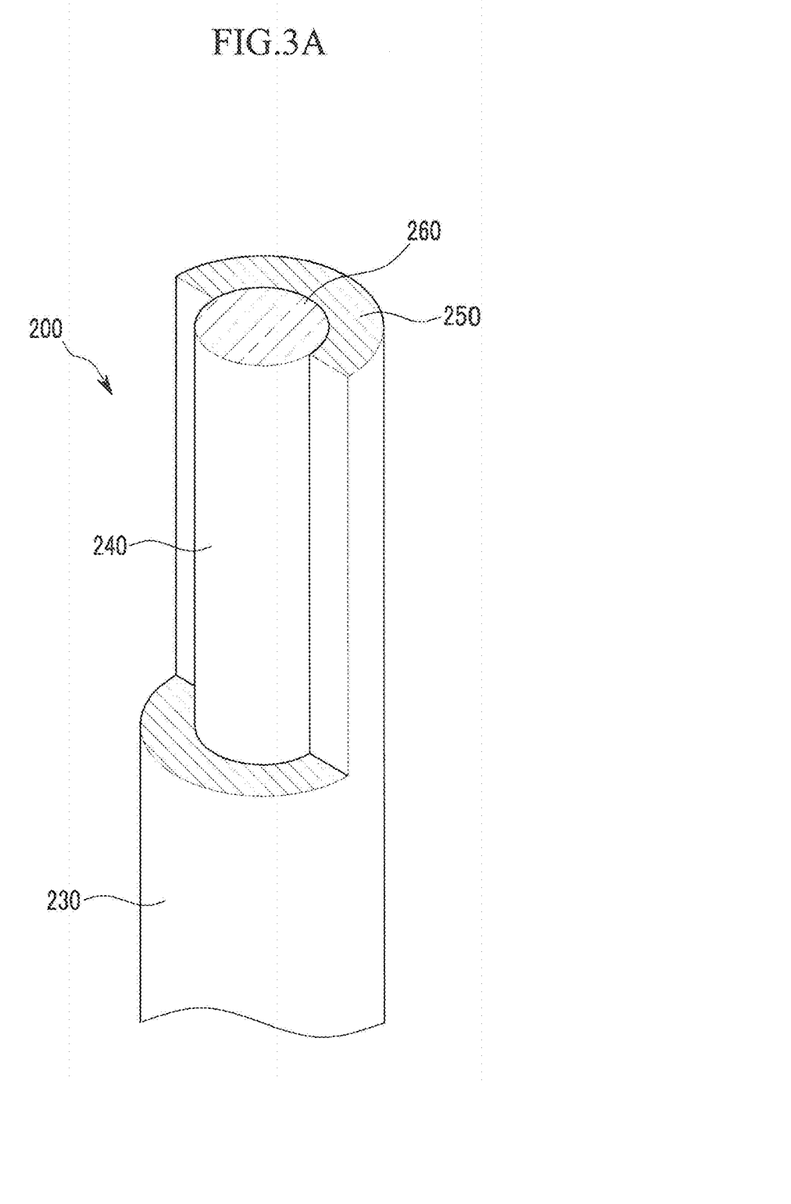
FIGS. 3A and 3B are schematic views of fibers having a core-sheath structure according to one embodiment.
Figure 3B:
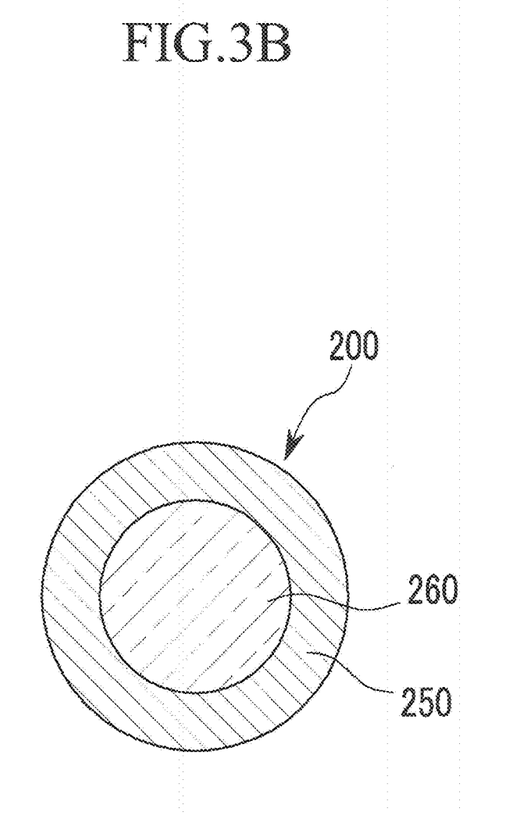

For example, the core-sheath structure includes a fiber including a core including a high melting-point polymer and a sheath including a low melting-point polymer surrounding the core. FIG. 3A and FIG. 3B show the core-sheath structure. FIG. 3A shows one example of the core-sheath 200 where the sheath is partially removed to show the inside core structure. FIG. 3B is a cross-sectional view exemplarily showing the core-sheath structure. In FIG. 3A and FIG. 3B, 250 indicates a cross-section of sheath, and 260 indicates a cross-section of core.

The term "sheath" generally refers to one polymer that surrounds another, core, polymer. The sheath is generally not the same material as the core. The sheath may completely enclose the core fiber. In one embodiment, the core fiber is generally cylindrical in shape and the entire outer cylindrical surface of the core fiber is covered by the sheath. In this case the sheath may also be cylindrical in shape although this is not required. The ends of the core fiber may or may not be covered with the sheath.

The melting point of polymer resin is measured according to the standard measuring method set by KS M ISO 11357-3 (plastic-disparity scan calorimeter (DSC) Part 3: a method of measuring the melting and crystallizing temperature and enthalpy) using a disparity scan calorimeter. The subject polymer resin is dried and heated from about 25° C. to about 300° C. at a heating speed of about 5° C./min to about 20° C./min to measure the melting peak temperature and to determine a melting point.

According to one embodiment, the high melting-point polymer refers to a polymer having a melting point (or referred to as a melting peak temperature) of about 200° C. to about 260° C. The high melting-point polymer may include, for example, a copolymer of poly(4-methyl pentene), 4-methyl pentene with C2 to C12 α-olefin, and a combination thereof, but is not limited thereto. The high melting-point polymer may be poly(4-methyl pentene). The C2 to C12 α-olefin may include, for example, ethylene, propylene, butene-1, hexene-1,3-methyl butene-1, octene-1, styrene, vinylcyclohexene, and the like. When it is a copolymer with 4-methyl pentene, the C2 to C12 α-olefin may be included in about 5 wt % to about 40 wt %, for example, about 5 wt % to about 20 wt %.

The high melting-point polymer corresponds to a core part of a fiber having a core-sheath structure.

According to one embodiment, the low melting-point polymer refers to a polymer having a melting point of about 100° C. to about 180° C. The low melting-point polymer may include polyolefin, but is not limited thereto. The polyolefin may include polyethylene, polypropylene, polybutene-1, for example, it may include polypropylene.

The low melting-point polymer corresponds to a sheath part in a fiber having a core-sheath structure.

The melting point difference between the high melting-point polymer and the low melting-point polymer may range from about 20° C. to about 160° C. What the melting point difference between the high melting-point polymer and the low melting-point polymer is about 20° C. to about 160° C. means is that the high melting-point polymer has a higher melting point, i.e., about 20° C. to about 160° C. higher than that of the low-melting point polymer. When the melting point difference between the high melting-point polymer and the low melting-point polymer of the polymer membrane for a battery is within this range, it is easy to manufacture a composite fiber having a core-sheath structure, and overly dense filming phenomenon is prevented. In other words, when the melting point difference between the high melting-point polymer and the low melting-point polymer is too small, filming phenomenon is excessive; however, when the melting point difference is too large, it is hard to manufacture a composite fiber having a core-sheath structure.

The porous support including a fiber having a core of the high melting-point polymer and a sheath of the low melting-point polymer makes it easy to select a temperature condition such that the core of the high melting-point polymer is not melted. The temperature is suitably selected to prevent the excessive filming phenomenon of the porous support and to provide a predetermined pore size.

The polymer membrane for a battery according to one embodiment includes a proton conductive polymer impregnated into the porous support The proton conductive polymer includes a perfluoro-based polymer, a benzimidazole-based polymer, a polyimide-based polymer, a polyetherimide-based polymer, a polyphenylene-sulfide-based polymer a polysulfone-based polymer, a polyethersulfone-based polymer, a polyetherketone-based polymer, a polyether-etherketone-based polymer, a polyphenylquinoxaline-based polymer, or a combination thereof. In one embodiment, poly(perfluorosulfonic acid), poly(perfluoro carboxylic acid), a copolymer of tetrafluoroethylene and fluorovinylether including a sulfonic acid group, defluorinated sulfide polyetherketone, aryl ketone, poly(2,2'-(m-phenylene)-5,5'-bibenzimidazole), poly(2,5-benzimidazole), or a combination thereof may be used. However, the porous conductive polymer included in the polymer membrane for a battery according to this disclosure is not limited thereto.

Hereinafter, a method of manufacturing the polymer membrane for a battery according to another embodiment is described.

The method of manufacturing a polymer membrane for a battery includes providing a non-woven fabric including a fiber having a core-sheath structure by spinning a high melting-point polymer resin by a first extruder to provide a core; spinning a low melting-point polymer resin by a second extruder to surround the core; calendaring the non-woven fabric to provide a porous support.

First, the fiber having the core-sheath structure may be obtained using two extruders. For example, the non-woven fabric may be obtained by spinning a high melting-point polymer resin by a first extruder to provide a core; spinning a low melting point resin by a second extruder to surround the core, so as to provide a fiber having a core-sheath structure; and simultaneously entangling fibers to provide a non-woven fabric. The obtained fiber has an average diameter of about 0.5 μm to about 5.0 μm. When the fiber has the average diameter within this range, it may provide excellent formability of non-woven fabric obtained from the fiber.

The fiber having a core-sheath structure may be spun in accordance with filament spinning, melt-blown, spun-bonded, electric spinning, or the like. According to one embodiment, it may be spun in accordance with a melt-blown process considering the fineness of fiber and workability.

Then the non-woven fabric including the fiber having a core-sheath structure is calendared to provide a porous support. During the calendaring process, the calendaring condition is optimized depending upon the kind and amount of polymer resin and the fiber diameter. The calendaring process may be performed at a pressure of about 200 psi to about 1,000 psi. In addition, the calendaring process may have a temperature of about 80° C. to about 160° C. Within the pressure and temperature range of the calendaring process, it is possible to provide a porous support having a porous layer shape with the desirable thickness and simultaneously to prevent the excessively-dense filming phenomenon of a porous layer such that the fiber having the core-sheath structure is melted to the core part.

During the calendaring process, the low melting-point polymer for the sheath part is partially fused to partially conjugate between the core-sheath fibers.

When a conventional porous support including a polymer resin is manufactured, the polymer resin for the porous support is excessively melted, so that a densely-filmed porous support is provided. However, since the porous support having a core-sheath structure according to one embodiment includes a core of high melting-point polymer resin during the calendaring process, it is comparatively stable at a high temperature to prevent excessive fusion, so as to remarkably improve the filming phenomenon such that a dense film is provided.

The porous support has an average pore size of about 0.1 μm to about 1.0 μm. When the porous support has the average pore size within this range, it suppresses the pin hole phenomenon that is generated in the polymer layer of a fuel cell. The pin hole phenomenon is one of the important causes of degradation in a fuel cell membrane-electrode assembly. It is caused by the attack of radicals generated by the reaction of the cathode with oxygen due to fuel crossover from the anode to the cathode. However, since the porous support according to one embodiment has an average pore size of about 0.1 μm to about 1.0 μm, it acts as an effective barrier for the radicals. In addition, when the porous support has an average pore size within the range, it may prevent separator performance degeneration and ion transmission degeneration that is caused by decomposing material generated by contact with electrolyte solution after long use of the separator in a rechargeable lithium battery, and simultaneously, it may prevent the deterioration of mechanical properties and short-circuits.

The porous support may have a porosity of about 20 to about 90%. When the porous support has porosity within the range of about 20 to about 90%, the ion conductivity is increased due to the proton conductive property of the proton conductive polymer impregnated in the porous support of a fuel cell. It is beneficial since the resistance is decreased by increasing the ion conductivity and since ion transportation is not interrupted in a rechargeable lithium battery.

In a fuel cell, the porous support may have a porosity of about 60 to about 80%. Within this range, the ion conductivity of proton conductive polymer is increased, and simultaneously, the resistance is decreased.

The method of manufacturing a polymer membrane for a battery may further include impregnating a proton conductive polymer resin when the polymer membrane is applied to the fuel cell.

The step of impregnating the proton conductive polymer resin includes filling the proton conductive polymer into the inside of micropores of the obtained porous supporter. Powdery proton conductive polymer resin may be mixed with a solvent to provide a solution and filled in the porous support. It is enough to provide the proton conductive polymer resin solution with a suitable viscosity that is not excessively diluted. The viscosity is easily controlled by a person of ordinary skill in the art depending upon the kind of proton conductive polymer resin and the thickness of obtained proton conductive polymer resin layer, so a detailed description will be omitted.

When it may further include a proton conductive polymer resin layer, the proton conductive polymer resin layer may have a thickness of about 3 to 5 μm. Within this range, the resistance of polymer electrolyte membrane of a fuel cell is not excessively increased, and the physical characteristics are improved.

The proton conductive polymer may be selected from the group consisting of a perfluoro-based polymer, a benzimidazole-based polymer, a polyimide-based polymer, a polyetherimide-based polymer, a polyphenylenesulfide-based polymer a polysulfone-based polymer, a polyethersulfone-based polymer, a polyetherketone-based polymer, a polyether-etherketone-based polymer, a polyphenylquinoxaline-based polymer, and combinations thereof. In one embodiment, it is at least one selected from the group consisting of poly(perfluorosulfonic acid), poly(perfluoro carboxylic acid), a copolymer of tetrafluoroethylene and fluorovinylether including a sulfonic acid group, defluorinated sulfide polyetherketone, aryl ketone, poly(2,2'-(m-phenylene)-5,5'-bibenzimidazole), poly(2,5-benzimidazole), and combinations thereof. On the other hand, the kind of proton conductive polymer included in a polymer electrolyte membrane for a battery according to one embodiment is not limited thereto.

The polymer resin having a proton conductivity may have a side chain of a cationic exchange group selected from the group consisting of sulfonic acid group, carboxylic acid group, phosphoric acid group, phosphonic acid group, and derivatives thereof.

According to one embodiment, the solvent may be a polar solvent, for example, water; an alcohol solvent such as methanol, ethanol, isopropylalcohol and so on; an amide solvent such as dimethyl acetamide; or a sulfoxide solvent such as dimethylsulfoxide.

According to one embodiment, the filling of the proton conductive polymer in micropores is performed by at least one selected from the group consisting of a dip-coating, dipping, spraying, screen printing, doctor blade, and slot die. The proton conductive polymer is three-dimensionally connected in the micropores to provide an ion transport pathway.

The proton conductive polymer may be included in about 5 to about 95 volume % based on the entire pore volume of the porous support. That is, a pore wherein the proton conductive polymer is not impregnated may be present. When the proton conductive polymer is included within the range, it maintains the proton conductivity and simultaneously prevents the volume expansion due to moisture.

The method of manufacturing the polymer membrane for a battery may further include subjecting hydrophilic treatment to the calendared porous polymer membrane. When the hydrophilic treatment is further included, the hydrophilic treatment may performed before the impregnation step. The hydrophilic treatment may be selected from the group consisting of dipping the calendared porous supporter in acrylic acid; treating the surface; and dipping in acrylic acid and treating the surface.

The efficiency of a battery is increased by providing hydrophilicity on the surface of the porous support through hydrophilic treatment. The surface treatment of the porous polymer membrane is selected from the group consisting of a plasma treatment, a corona treatment, a gamma-ray treatment, a electron beam treatment, or a combination thereof. Thereby, the polymer membrane for a battery according to one embodiment provides improved dimensional stability and thermal stability of the polymer membrane for a battery and excellent mechanical characteristics and decreases the mass transfer resistance of fuel.

According to further another embodiment, provided is a battery that includes a cathode and an anode facing each other and the polymer membrane for a battery positioned between the cathode and the anode.

According to further another embodiment, the battery may be a fuel cell. The fuel cell includes a membrane-electrode assembly (MEA) for a fuel cell including a polymer membrane for a battery such that the high melting-point polymer layer is impregnated in the porous support including the fiber including the core including the high melting-point polymer, and the sheath including the low melting-point polymer and surrounding the core according to one embodiment, wherein the melting point difference of the high melting point polymer and the low melting-point polymer ranges from about 20° C. to about 160° C. The polymer membrane for a battery including the porous support including the fiber having a core-sheath impregnated with the proton conductive polymer is the same as described in above, so is omitted.

The membrane-electrode assembly includes a cathode and an anode, and the cathode and anode include an electrode substrate and a catalyst layer, respectively. The catalyst layer can include any catalyst participating in a fuel cell reaction, for example, a platinum-based catalyst. The platinum-based catalyst may be at least one selected from the group consisting of platinum, ruthenium, osmium, a platinum-ruthenium alloy, a platinum-osmium alloy, a platinum-palladium alloy, or a platinum-M alloy (M is at least one transition element selected from the group consisting of Ga, Ti, V, Cr, Mn, Fe, Co, Ni, Cu, Zn, Sn, Mo, W, Rh, and Ru). As mentioned above, the anode and the cathode may include the same material. However, a direct oxidation fuel cell may include a platinum-ruthenium alloy catalyst as an anode catalyst in order to prevent catalyst poisoning due to CO generated during the anode reaction. Non-limiting examples of the platinum-based catalyst are selected from the group consisting of Pt, Pt/Ru, Pt/W, Pt/Ni, Pt/Sn, Pt/Mo, Pt/Pd, Pt/Fe, Pt/Cr, Pt/Co, Pt/R/W, Pt/Ru/Mo, Pt/Ru/V, Pt/Fe/Co, Pt/Ru/Rh/Ni, and Pt/Ru/Sn/W.

Such a metal catalyst may be used in a form of a metal itself (black catalyst), or one supported on a carrier. The carrier may include a carbon-based material such as graphite, denka black, ketjen black, acetylene black, carbon nanotubes, carbon nanofiber, carbon nanowire, carbon nanoballs, activated carbon, and the like, or an inorganic particulate such as alumina, silica, zirconia, titania, and the like. A carbon-based material is generally used in the art. A noble metal supported on a carrier may be a commercially available one or can be prepared by supporting a noble metal on a carrier. The method of supporting a noble metal on a carrier is well-known in this field and a detailed description thereof is omitted.

The catalyst layer may further include a binder resin to improve its adherence and proton transfer properties. The binder resin may be proton conductive polymer resins having a cation exchange group selected from the group consisting of a sulfonic acid group, a carboxylic acid group, a phosphoric acid group, a phosphonic acid group, and derivatives thereof on its side chain.

The electrode substrates support the anode and cathode and provide a path for transferring fuel and oxidant to catalyst layers. In one embodiment, the electrode substrates are formed from a material such as carbon paper, carbon cloth, carbon felt, or a metal cloth (a porous film composed of metal fiber or a metal film disposed on a surface of a cloth composed of polymer fibers). The electrode substrate is not limited thereto.

The electrode substrates may be treated with a fluorine-based resin to be water-repellent to prevent deterioration of diffusion efficiency due to water generated during operation of a fuel cell. Non-limiting examples of the fluorine-based resin may include polytetrafluoroethylene, polyvinylidene fluoride, polyhexafluoropropylene, polyperfluoroan alkylvinylether, polyperfluorosulfonyl fluoride alkoxyvinyl ether, fluorinated ethylene propylene, polychlorotrifluoroethylene, or copolymers thereof.

A microporous layer can be added between the aforementioned electrode substrates and catalyst layer to increase reactant diffusion effects. The microporous layer generally includes conductive powders with a particular particle diameter. The conductive material may include, but is not limited to, carbon powder, carbon black, acetylene black, activated carbon, carbon fiber, fullerene, nano-carbon, or combinations thereof. The nano-carbon may include a material such as carbon nanotubes, carbon nanofiber, carbon nanowire, carbon nanohorns, carbon nanorings, or combinations thereof.

The microporous layer is formed by coating a composition including a conductive powder, a binder resin, and a solvent on the electrode substrate. The binder resin may include, but is not limited to, polytetrafluoroethylene, polyvinylidenefluoride, polyhexafluoropropylene, polyperfluoroan alkylvinylether, polyperfluorosulfonylfluoride, alkoxyvinyl ether, polyvinylalcohol, cellulose acetate, or copolymers thereof. The solvent includes water, alcohols such as ethanol, isopropyl alcohol, n-propyl alcohol, and butanol, dimethyl acetamide, dimethylsulfoxide, N-methylpyrrolidone, tetrahydrofuran, and the like. The coating method may include, but is not limited to, screen printing, spray coating, doctor blade methods, gravure coating, dip coating, silk screening, painting, and the like, depending on the viscosity of the composition.

The battery according to one embodiment may be a fuel cell. The fuel cell includes at least one electricity generating element, a fuel supplier, and an oxidizing agent supplier, and the electricity generating element includes the membrane-electrode assembly for a fuel cell including the polymer membrane for a battery.

Figure 1:
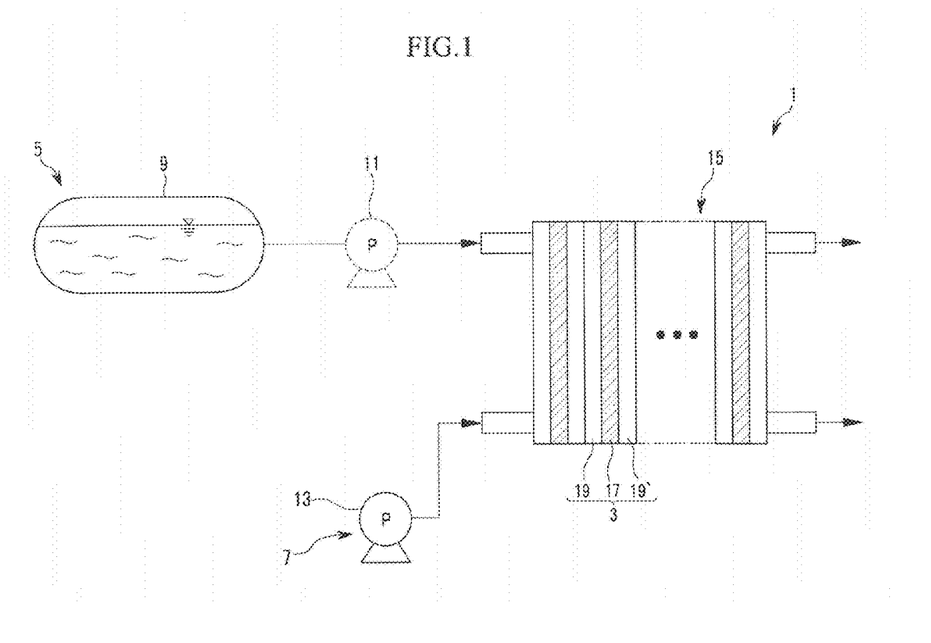
FIG. 1 is a schematic view showing a structure of a fuel cell system.

FIG. 1 shows a schematic structure of a fuel cell system of the embodiment, which will be described in detail with reference to this accompanying drawing as follows. FIG. 1 shows a fuel cell system supplying fuel and an oxidizing agent to an electrical generating element using a pump, but the fuel cell system according to the embodiment is not limited to such structures. The fuel cell of the embodiment alternatively includes a structure wherein a fuel and an oxidant are provided by a diffusion process.

A fuel cell system 1 of the embodiment includes at least one electricity generating element 3 that generates electrical energy by oxidation of a fuel and reduction of an oxidizing agent, a fuel supplier 5 for supplying the fuel, and an oxidant supplier 7 for supplying an oxidant to the electricity generating element 3.

In addition, the fuel supplier 5 is equipped with a tank 9, which stores fuel, and a pump 11, which is connected therewith. The fuel pump 11 supplies fuel that is stored in the tank 9 with a predetermined pumping power.

The oxidant supplier 7, which supplies the electricity generating element 3 with the oxidant, is equipped with at least one oxidant pump 13 for supplying the oxidant with a predetermined pumping power.

The electricity generating element 3 includes a membrane-electrode assembly 17, which oxidizes hydrogen or a fuel and reduces an oxidant, and separators 19 and 19' that are respectively positioned at opposite sides of the membrane-electrode assembly and that supply hydrogen or a fuel, and an oxidant, respectively. The stack 15 is provided by stacking at least one of the electricity generating elements 3.

The battery according to another embodiment may be a rechargeable battery. The rechargeable battery includes a separator interposed between a cathode and an anode, and the separator may be a polymer membrane for a battery.

In the rechargeable battery, the cathode includes a cathode active material being capable of intercalating and deintercalating lithium ions, and the cathode active material includes oxide including lithium and at least one metal selected from the group consisting of cobalt, manganese, nickel, and combinations thereof. In one embodiment, the compound represented by one of the following Chemical Formulae may be preferable.

$Li_aA_{1-b}X_bD_2 (0.90 \leq a \leq 1.8, 0 \leq b \leq 0.5)$;

$Li_aE_{1-b}X_bO_{2-c}D_c (0.90 \leq a \leq 1.8, 0 \leq b \leq 0.5, 0 \leq c \leq 0.05)$;

$LiE_{2-b}X_bO_{4-c}D_c (0 \leq b \leq 0.5, 0 \leq c \leq 0.05)$;

$Li_aNi_{1-b-c}Co_bX_cD_\alpha (0.90 \leq a \leq 1.8, 0 \leq b \leq 0.5, 0 \leq c \leq 0.05, 0 \leq \alpha \leq 2)$;

$Li_aNi_{1-b-c}Co_bX_cO_{2-\alpha}T_\alpha (0.90 \leq a \leq 1.8, 0 \leq b \leq 0.5, 0 \leq c \leq 0.05, 0 < \alpha < 2)$;

$Li_aNi_{1-b-c}Co_bX_cO_{2-\alpha}T_2 (0.90 a \leq 1.8, 0 b \leq 0.5, 0 \leq c \leq 0.05, 0 < \alpha < 2)$;

$Li_aNi_{1-b-c}Mn_bX_cD_\alpha (0.90 \leq a \leq 1.8, 0 \leq b \leq 0.5, 0 \leq c \leq 0.05, 0 < \alpha < 2)$;

$Li_aNi_{1-b-c}Mn_bX_cO_{2-\alpha}T_\alpha (0.90 \leq a \leq 1.8, 0 \leq b \leq 0.5, 0 \leq c \leq 0.05, 0 < \alpha < 2)$;

$Li_aNi_{1-b-c}Mn_bX_cO_{2-\alpha}T_2 (0.90 \leq a \leq 1.8, 0 \leq b \leq 0.5, 0 c \leq 0.05, 0 < \alpha < 2)$;

$Li_aNi_bE_cG_dO_2 (0.90 \leq a \leq 1.8, 0 \leq b \leq 0.9, 0 \leq c \leq 0.5, 0.001 \leq d \leq 0.1)$;

$Li_aNi_bCo_cMn_dG_eO_2 (0.90 \leq a \leq 1.8, 0 \leq b \leq 0.9, 0 \leq c \leq 0.5, 0 \leq d \leq 0.5, 0.001 \leq e \leq 0.1)$;

$Li_aNiG_bO_2 (0.90 \leq a \leq 1.8, 0.001 \leq b \leq 0.1)$;

$Li_aCoG_bO_2 (0.90 \leq a \leq 1.8, 0.001 \leq b \leq 0.1)$;

$Li_aMnG_bO_2 (0.90 \leq a \leq 1.8, 0.001 \leq b \leq 0.1)$;

$Li_aMn_2G_bO_4 (0.90 \leq a \leq 1.8, 0.001 \leq b \leq 0.1); QO_2$;

$QS_2$;

$LiQS_2$;

$V_2O_5$;

$LiV_2O_5$;

$LiZO_2$;

$LiNiVO_4$;

$Li_{(3-f)}J_2(PO_4)_3 (0 \leq f \leq 2)$;

$Li_{(3-f)}Fe_2(PO_4)_3 (0 \leq f \leq 2)$;

$LiFePO_4$.

In the above Chemical Formulae,

A is selected from the group consisting of Ni, Co, Mn, and combinations thereof;

X is selected from the group consisting of Al, Ni, Co, Mn, Cr, Fe, Mg, Sr, V, a rare earth element, and combinations thereof;

D is selected from the group consisting of O, F, S, P, and combinations thereof;

E is selected from the group consisting of Co, Mn, and combinations thereof;

T is selected from the group consisting of F, S, P and combinations thereof;

G is selected from the group consisting of Al, Cr, Mn, Fe, Mg, La, Ce, Sr, V, and combinations thereof;

Q is selected from the group consisting of Ti, Mo, Mn, and combinations thereof;

Z is selected from the group consisting of Cr, V, Fe, Sc, Y, and combinations thereof; and J is selected from the group consisting of V, Cr, Mn, Co, Ni, Cu, and combinations thereof.

The cathode active material may include the cathode active material with the coating layer, or a compound of the active material and the active material coated with the coating layer. The coating layer may include at least one coating element compound selected from the group consisting of an oxide and a hydroxide of the coating element, an oxyhydroxide of the coating element, an oxycarbonate of the coating element, and a hydroxycarbonate of the coating element. The compound for the coating layer may be either amorphous or crystalline. The coating element included in the coating layer may be selected from the group consisting of Mg, Al, Co, K, Na, Ca, Si, Ti, V, Sn, Ge, Ga, B, As, Zr, and combinations thereof. The coating process may include any conventional processes as long as it does not cause any side effects to the properties of the cathode active material (e.g., spray coating, immersing), which is well known to persons having ordinary skill in this art, so a detailed description thereof is not provided. The cathode active material layer further includes a binder and a conductive material.

In the rechargeable battery, the anode includes an anode active material that reversibly intercalates/deintercalates lithium ions, and the anode active material includes lithium metal, a lithium metal alloy, a material being capable of doping lithium, or a transition metal oxide. Any compound used as anode active material for a rechargeable lithium battery anode active material may be also used without limitation.

The material that reversibly intercalates/deintercalates lithium ions includes carbon materials. The carbon materials may be any generally-used carbon-based anode active material for a lithium ion rechargeable battery. Examples of the carbon material include crystalline carbon, amorphous carbon, and a mixture thereof. Examples of the lithium metal alloy includes lithium a metal selected from the group consisting of Na, K, Rb, Cs, Fr, Be, Mg, Ca, Sr, Si, Sb, Pb, In, Zn, Ba, Ra, Ge, Al, and Sn. Examples of the material being capable of doping lithium include Si, $SiO_x$ (0<x<2), a Si-Q alloy (where Q is an element selected from the group consisting of an alkali metal, an alkaline-earth metal, a group 13 element, a group 14 element, a transition element, a rare earth element, and combinations thereof, and is not Si), Sn, $SnO_2$, Sn—R (where R is an element selected from the group consisting of an alkali metal, an alkaline-earth metal, a group 13 element, a group 14 element, a transition element, a rare earth element, and combinations thereof, and is not Sn), and mixtures thereof. At least one of these materials may be mixed with $SiO_2$. The elements Q and R are selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and combinations thereof. At least one above anode active material may be used with mixing $SiO_2$. Examples of the transition metal oxide include vanadium oxide, lithium vanadium oxide, and the like. The anode active material layer may also include a binder, and selectively further include a conductive material.

In the rechargeable battery, the separator is a polymer membrane for a battery including a porous support including a fiber including a core of high melting-point polymer and a sheath of low melting-point polymer surrounding the core, wherein the melting-point difference of the high melting-point polymer and the low melting-point polymer ranges from about 20° C. to about 160° C. The polymer membrane for a battery is used in a state that does not further include a proton conductive polymer. The polymer membrane for a battery is the same as described in above, so the repetition here of that description is unnecessary.

The rechargeable lithium battery includes an electrolyte including a lithium salt and a non-aqueous organic solvent.

The lithium salt supplies lithium ions in the battery, and operates a basic operation of a rechargeable lithium battery and improves lithium ion transport between a cathode and an anode. Non-limiting examples of the lithium salt include at least one supporting salt selected from $LiPF_6$, $LiBF_4$, $LiSbF_6$, $LiAsF_6$, $LiCF_3SO_3$, $LiN(CF_3SO_2)_3$, $Li(CF_3SO_2)_2N$, $LiC_4F_9SO_3$, $LiClO_4$, $LiAlO_4$, $LiAlCl_4$, $LiN(C_xF_{2x+1}SO_2)$ (where x and y are natural numbers), LiCl, and LiI. The lithium salt may be used at a 0.6 to 2.0M concentration. When the lithium salt is included at the above concentration range, lithium ion mobility may not be inhibited to optimal electrolyte conductivity and viscosity.

The non-aqueous organic solvent acts as a medium for transmitting ions taking part in the electrochemical reaction of a battery. The non-aqueous organic solvent may include a carbonate-based, ester-based, ether-based, or ketone-based solvent. The carbonate includes cyclic carbonate or linear carbonate. The organic solvent may be used singularly or in a mixture. When the organic solvent is used in a mixture, a mixture ratio can be controlled in accordance with a desirable battery performance. The cyclic carbonate includes one selected from the group consisting of ethylene carbonate, propylene carbonate and mixtures thereof, and the linear carbonate includes one selected from the group consisting of dimethyl carbonate, diethyl carbonate, ethylmethyl carbonate, and methylpropyl carbonate. The ester may include γ-butyrolactone, valerolactone, decanolide, valerolactone, and the like. The ketone includes polymethylvinyl ketone.

According to the method of manufacturing a polymer membrane for a battery according to another embodiment, the porous supporter for a separator of rechargeable lithium battery is obtained by spinning a high melting-point polymer resin by a first extruder to provide a core; spinning a low melting-point polymer resin by a second extruder to surround the core to provide a non-woven fabric including a fiber having a core-sheath structure; and calendaring the non-woven fabric to provide a porous support. The detailed description of each step is the same as described above, so repetition of these steps here is unnecessary.

Figure 2:
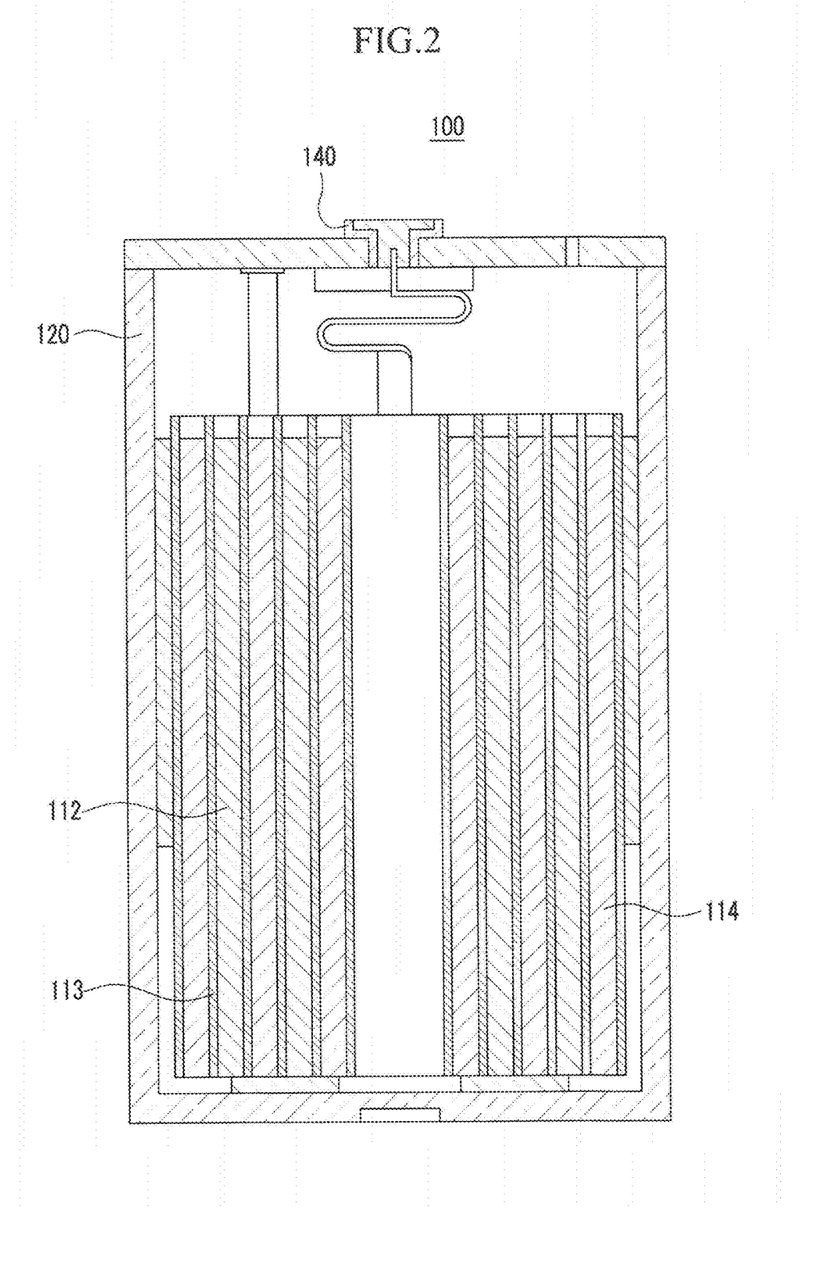
FIG. 2 is a schematic view showing a structure of a rechargeable lithium battery.

FIG. 2 shows a structure of a rechargeable lithium battery constructed according to one embodiment. FIG. 2 illustrates a cylindrical rechargeable lithium battery 100, which includes an anode 112, a cathode 114, a separator 113 interposed between the anode 112 and the cathode 114, an electrolyte (not shown) impregnating the separator 113, a battery case 120, and a sealing member 140 sealing the battery case 120. The rechargeable lithium battery 100 is fabricated by sequentially stacking an anode 112, a cathode 114, and a separator 113 and spiral-winding to house spiral-wound product in a battery case 120.

Hereinafter, the embodiments are illustrated in more detail with reference to examples. However, the following are exemplary embodiments and are not limiting. A person having ordinary skill in this art can sufficiently understand parts of the present invention that are not specifically described.

Preparation of Polymer Membrane

Example 1

A non-woven fabric was obtained using poly(4-methyl pentene) (PMP, core, melting point: 236° C.) as a high melting-point polymer and polypropylene (PP, sheath, melting point: 165° C.) as a low melting-point polymer to spin a fiber having a core-sheath.

Then the obtained non-woven fabric was pressed at a temperature of about 130° C. and a pressure of about 500 psi by the calendaring process to provide a membrane porous support having a thickness of about 15 μm. The porous support had an average pore size of about 0.2 μm when it was measured by a Capillary Flow is Porometer (Model number: CFP-1200-AEL, manufactured by Porous Materials) and a porosity of about 40% when it was measured by a Mercury Porosimeter (Model number: AUTOPORE IV 9500, manufactured by Micrometrics Instrument).

The pressed porous support was dipped in polyacrylic acid and subjected with argon plasma treatment by a plasma surface treating device (Model number: CD400PLC, manufactured by Europlasma). The argon gas was flowed in a rate of about 300 cm³/min to about 500 cm³/min for about 10 minutes during the plasma treatment.

The obtained porous support was impregnated in Nafion solution (Nafion Dispersion 2021, manufactured by DuPont, concentration: 5 wt %, solvent: water and isopropylalcohol (volume ratio=50:50), component: poly(perfluorosulfonic acid)) and heated at a temperature of about 120 to about 140° C. for 3 hours to provide a polymer electrolyte membrane for a fuel cell.

Comparative Example 1

A Nation membrane was prepared using the commercially available Nation ionomer (Nation Dispersion 2021, manufactured by DuPont). The obtained Nation membrane was heated at a temperature of about 120 to about 140° C. for 3 hours.

Experimental Example 1

Measuring Dimensional Stability of Polymer Membrane Depending Upon to Heating Temperature Polymer membranes obtained from Example 1 and Comparative Example 1 were thermally shrunk at about 165° C. for about 7 minutes to measure the thermal shrinkage. The thermal shrinkage was determined by measuring a length difference before shrinking at about 165° C. and after the treatment. The thermal shrinkage was is calculated in percentage of surface area change before and after the treatment. The results are shown in the following Table 1.

TABLE 1

|  | Example 1 (PP/PMP) | | Comparative Example 1 (NAFION) | |
| --- | --- | --- | --- | --- |
| heat treatment temperature (° C.) | 120 | 140 | 120 | 140 |
| Thermal shrinkage at 165° C. (%) | 13.8 | 8.8 | 25.6 | 13.6 |

Figure 4:
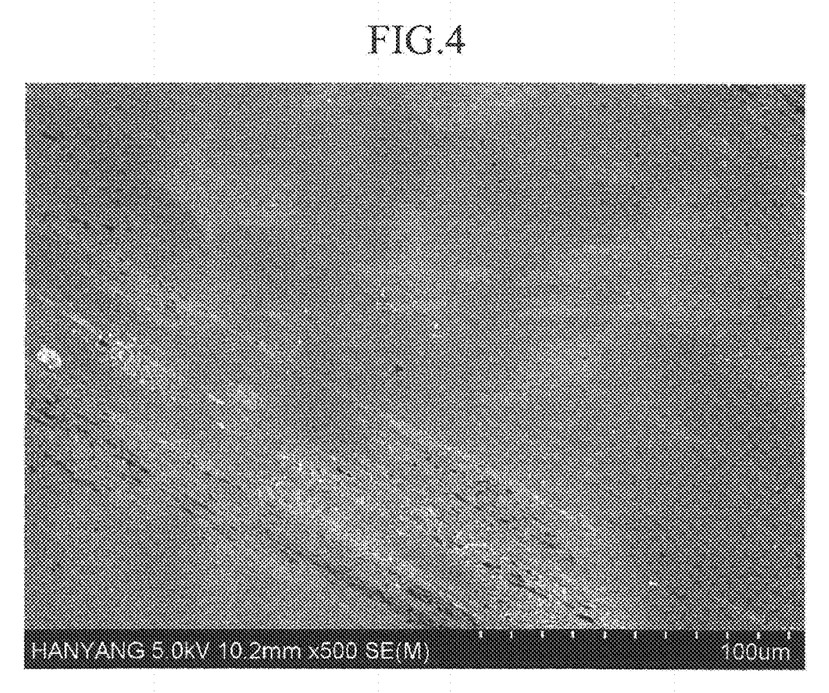
FIG. 4 is a SEM photograph showing a porous support obtained during preparation of the polymer membrane for a battery according to Example 1 after performing a calendaring process.
Figure 5:
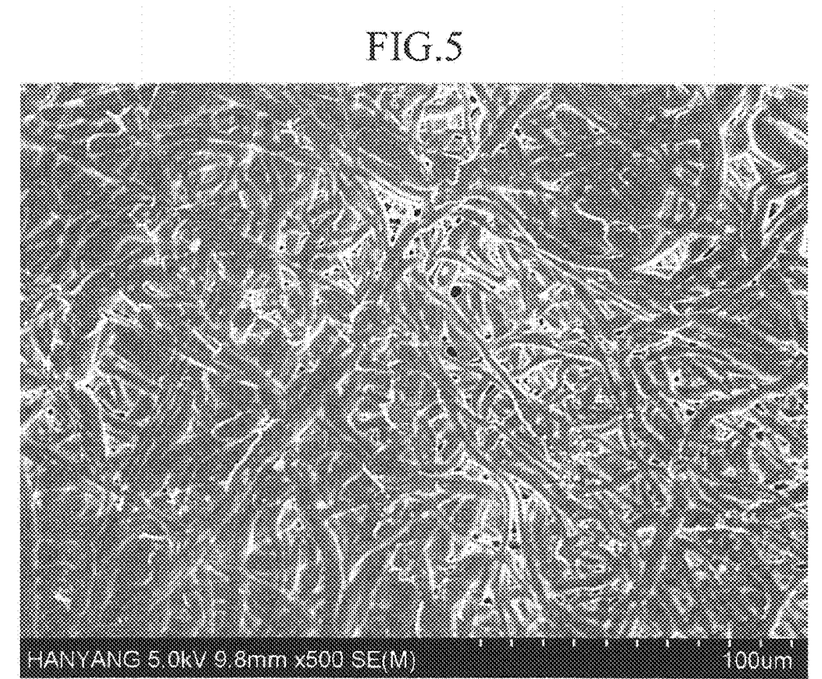
FIG. 5 is a SEM photograph showing a porous support obtained during preparation of the polymer membrane for a battery according to Comparative Example 1.

FIG. 4 and FIG. 5 are SEM photographs after calendaring the porous supports according to Example 1 and Comparative Example 1, respectively. As shown in FIG. 4, the porous support according to Example 1 shown in FIG. 4 improved the excessive filming phenomenon compared to that of Comparative Example 1 shown in FIG. 5.

Experimental Example 2

Thermogravimetric Analysis

Figure 6:
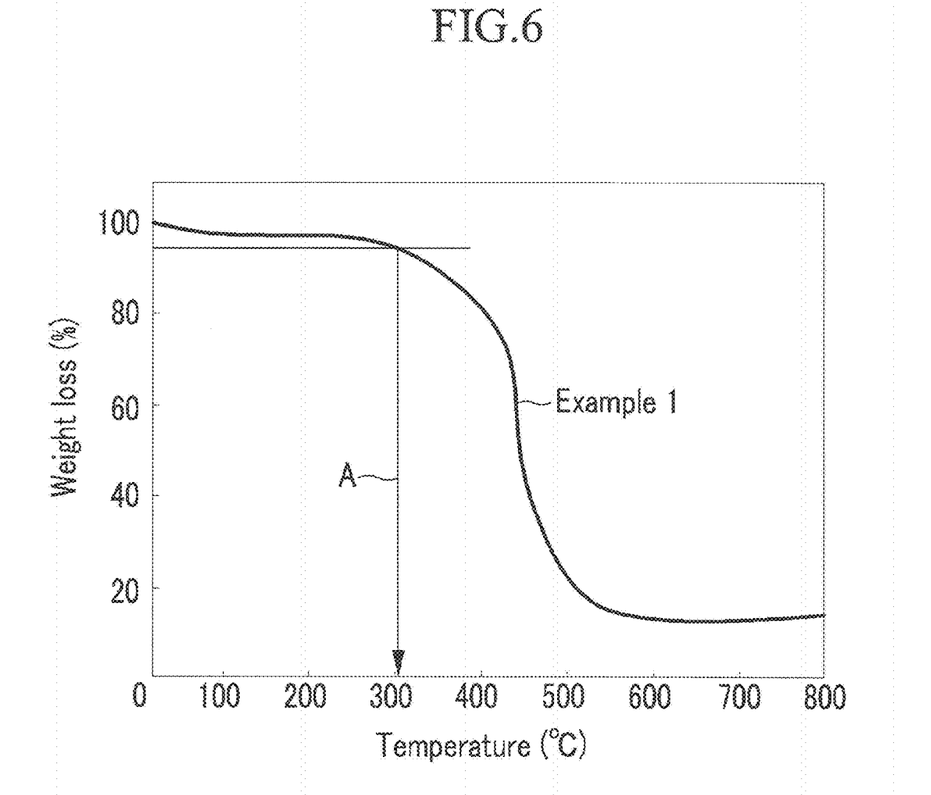
FIG. 6 is a TGA of a polymer membrane for a battery according to Example 1.
Figure 7:
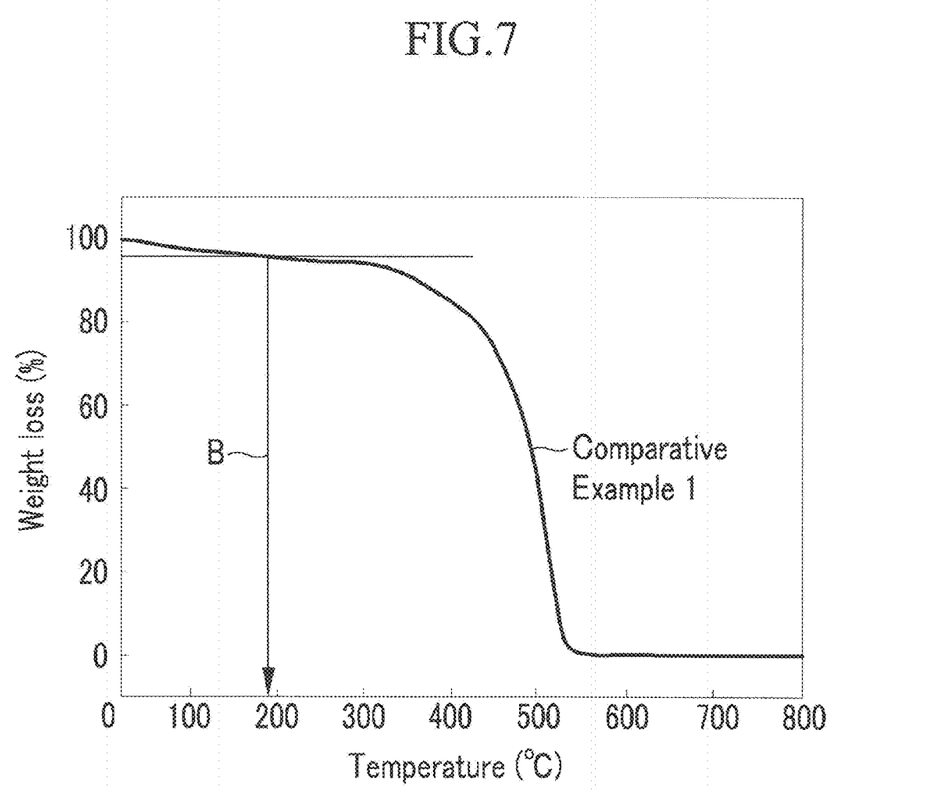
FIG. 7 is a TGA of a polymer membrane for a battery according to Comparative Example 1.

Each polymer membrane obtained from the Example 1 and Comparative Example 1 was subjected with a thermogravimetric analysis (TGA). The thermogravimetric analysis was performed using a thermogravimetric analyzer to (2950TGA, TA Instrument, USA) under the nitrogen atmosphere at a heating speed of 10° C./minutes, and the results are shown in FIG. 6 and FIG. 7. FIG. 6 shows the thermogravimetric analysis result of polymer membrane obtained from Example 1; and FIG. 7 shows the thermogravimetric analysis result of a polymer membrane obtained from Comparative Example 1.

As shown in FIG. 7, the polymer membrane of Comparative Example 1 lost the weight due to the heat before about 200° C., so it is understood that the thermal decomposition is remarkably progressed before about 200° C. (referring to line B). In addition, as shown in FIG. 6, the polymer membrane obtained from Example 1 lost weight due to the heat in less than 5% based on the entire weight until around 300° C. (referring to line A). In FIG. 6 and FIG. 7, line A and line B indicate temperatures at a point of losing the weight by 5% based on the entire weight during the thermogravimetric analysis.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A polymer membrane for a battery comprising a porous support comprising:
    a fiber comprising a core comprising a high melting-point polymer; and a sheath comprising a low melting-point polymer surrounding the core; and
    a proton conductive polymer impregnated in the porous support, wherein the proton conductive polymer is filled inside micropores of the porous support;
    wherein the melting point difference between the high melting-point polymer and the low melting-point polymer ranges from 20° C. to 160° C.

2. The polymer membrane for a battery of claim 1, wherein the proton conductive polymer is included at 5 to 95 volume % of proton conductive polymer based on the entire volume (100 volume %) of the porous support.

3. The polymer membrane for a battery of claim 1, wherein the polymer membrane for a battery is a polymer electrolyte membrane for a fuel cell.

4. The polymer membrane for a battery of claim 1, wherein the polymer membrane for a battery is a separator for a rechargeable battery.

5. The polymer membrane for a battery of claim 1, wherein the high melting-point polymer has a melting point of 200° C. to 260° C.

6. The polymer membrane for a battery of claim 1, wherein the high melting-point polymer is selected from the group consisting of copolymers of poly (4-methyl pentene), 4-methyl pentene with C2 to C12 α-olefin, and combinations thereof.

7. The polymer membrane for a battery of claim 1, wherein the high melting-point polymer is poly (4-methyl pentene).

8. The polymer membrane for a battery of claim 1, wherein the low melting-point polymer has a melting point of 100° C. to 180° C.

9. The polymer membrane for a battery of claim 1, wherein the low melting-point polymer is polyolefin having a melting point of 100° C. to 180° C.

10. The polymer membrane for a battery of claim 1, wherein the low melting-point polymer is selected from the group consisting of polypropylene, polyethylene, and combinations thereof.

11. The polymer membrane for a battery of claim 1, wherein the low melting-point polymer is included at 5 parts by weight to 50 parts by weight based on a total 100 parts by weight of the low melting-point polymer and the high melting-point polymer.

12. A battery comprising:
    a cathode and an anode; and
    a polymer membrane for a battery of claim 1 disposed between the cathode and the anode.

* * * * *